(12) United States Patent
Ma

(10) Patent No.: US 7,655,707 B2
(45) Date of Patent: Feb. 2, 2010

(54) PIGMENTED INK-JET INKS WITH IMPROVED IMAGE QUALITY ON GLOSSY MEDIA

(75) Inventor: Zeying Ma, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 512 days.

(21) Appl. No.: 11/292,580

(22) Filed: Dec. 2, 2005

(65) Prior Publication Data
US 2007/0129462 A1    Jun. 7, 2007

(51) Int. Cl.
*C09D 11/00* (2006.01)
(52) U.S. Cl. .................. 523/160; 523/161; 524/556
(58) Field of Classification Search ............. 106/31.13, 106/218; 523/160; 524/366; 347/1, 54, 347/56, 68, 73, 100, 112
See application file for complete search history.

(56) References Cited

U.S. PATENT DOCUMENTS

| | | | |
|---|---|---|---|
| 5,223,026 A | 6/1993 | Schwarz, Jr. | |
| 5,250,109 A | 10/1993 | Chan et al. | |
| 5,281,261 A | 1/1994 | Lin | |
| 5,713,993 A * | 2/1998 | Grezzo Page et al. | 106/31.85 |
| 5,739,833 A | 4/1998 | Yamazaki et al. | |
| 5,883,157 A | 3/1999 | Yamashita et al. | |
| 6,063,834 A * | 5/2000 | Kappele et al. | 523/160 |
| 6,087,416 A | 7/2000 | Pearlstine et al. | |
| 6,231,652 B1 | 5/2001 | Koyano et al. | |
| 6,341,856 B1 * | 1/2002 | Thompson et al. | 347/100 |
| 6,459,501 B1 | 10/2002 | Holmes | |
| 6,488,753 B1 | 12/2002 | Ito et al. | |
| 6,500,248 B1 | 12/2002 | Hayashi | |
| 6,509,393 B2 | 1/2003 | Malhotra | |
| 6,646,024 B2 * | 11/2003 | Beach et al. | 523/160 |
| 6,677,398 B2 * | 1/2004 | Egolf et al. | 524/522 |
| 6,695,443 B2 | 2/2004 | Arita et al. | |
| 6,716,912 B2 * | 4/2004 | Freeman et al. | 524/824 |
| 6,737,449 B1 | 5/2004 | Yatake | |
| 6,767,090 B2 | 7/2004 | Yatake et al. | |
| 6,802,893 B1 | 10/2004 | Komatsu et al. | |
| 6,899,754 B2 | 5/2005 | Yeh et al. | |
| 6,953,244 B2 * | 10/2005 | Chen et al. | 347/95 |
| 7,354,962 B1 * | 4/2008 | Akers et al. | 523/160 |
| 2001/0045178 A1 * | 11/2001 | Shirakawa et al. | 106/493 |
| 2003/0069329 A1 * | 4/2003 | Kubota et al. | 523/160 |
| 2003/0225185 A1 | 12/2003 | Akers et al. | |
| 2004/0032473 A1 * | 2/2004 | Ishimoto et al. | 347/100 |
| 2004/0063807 A1 * | 4/2004 | Wang et al. | 523/160 |
| 2004/0097615 A1 * | 5/2004 | Reem et al. | 523/160 |
| 2004/0110867 A1 * | 6/2004 | McCovick | 523/160 |
| 2004/0151910 A1 * | 8/2004 | Koller et al. | 428/403 |
| 2004/0239738 A1 * | 12/2004 | Watanabe | 347/100 |
| 2008/0187726 A1 * | 8/2008 | Sakai et al. | 428/195.1 |

FOREIGN PATENT DOCUMENTS

EP    1 586 611 A    10/2005

* cited by examiner

*Primary Examiner*—David Wu
*Assistant Examiner*—Vu Nguyen

(57) ABSTRACT

Compositions and methods of printing an ink-jet image are provided. The composition can be an ink-jet ink comprising an aqueous liquid vehicle, polymer-encapsulated pigment solids dispersed in the liquid, a first copolymeric binder, and a second copolymeric binder. The polymer-encapsulated pigment solids can have a pigment core and a copolymeric shell, wherein the copolymeric shell includes multiple polymerized monomers. The first copolymeric binder can include at least one of the multiple polymerized monomers but which is different than the copolymeric shell. The second copolymeric binder can include at least one of the multiple polymerized monomers, but is also different than the copolymeric shell and the first copolymeric binder.

36 Claims, No Drawings

PIGMENTED INK-JET INKS WITH IMPROVED IMAGE QUALITY ON GLOSSY MEDIA

FIELD OF THE INVENTION

The present invention relates generally to ink-jet ink compositions. More particularly, the present invention relates to pigment-based ink-jet inks that exhibit improved image quality, particularly when printing on glossy media.

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, etc. As new ink-jet inks and print engines are developed, there have been several traditional characteristics to consider when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. The long term reliability without material degradation or nozzle clogging becomes even more important with the advent of print engines that eject smaller drop volumes. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements One characteristic of ink-jet printing systems that is desirable to achieve is related to print quality, particularly with respect to gloss when printing pigmented inks on glossy media. Accordingly, investigations continue into developing ink formulations that can be printed with high image quality.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants, including pigments, to a substrate. Liquid vehicles are well known in the art, and a wide variety of liquid vehicle components may be used in accordance with embodiments of the present invention. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "pigment" refers to a colorant particle which is typically substantially insoluble in the liquid vehicle in which it is used.

"Polymer-encapsulated pigment" or a derivation thereof, refers to pigments that have been at least partially encapsulated or coated with a polymer, including polymers prepared from styrene, methacrylic acid, and/or acrylic acid monomers, or esters or other derivatives thereof, for example. These polymers can be coated on pigments to terminate the outer shell of the pigment with some charge, thereby creating some repulsive nature that reduces agglomeration of pigment particles within the liquid vehicle.

The term "glossy" when referring to glossy media, glossy photo paper, etc., includes paper substrates that are coated with a non-paper coating which provides gloss to the surface. Exemplary glossy media includes those coated inorganic porous particulates, e.g., silica, alumina, clay, etc., bound together by a polymeric binder. It should be noted that media coated with inorganic particulates is not necessarily glossy. Matte coatings, for example, are not considered to be glossy, whereas semi-glossy to high-gloss coatings are considered to be glossy.

Though the benefits of the ink-jet ink compositions are described herein primarily with respect their performance on both glossy media, it should be noted that these inks also perform well on other types of media. For example, though non-glossy coated papers and plain papers do not have the same issues with respect to coalescence as when the inks are printed on glossy media, general image quality improvements can be achieved when printing on porous, non-glossy media or plain paper.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The term "about" when referring to a numerical value or range is intended to encompass the values resulting from experimental error that can occur when taking measurements.

In accordance with the present invention, it has been recognized that it would be advantageous to develop pigment-based ink compositions that have improved print quality, including image gloss and/or low coalescence when printing on glossy media, such as glossy media coated with metal or semi-metal porous particulate-based coatings.

In accordance with embodiments of the present invention, an ink-jet ink can comprise an aqueous liquid vehicle, a polymer-encapsulated pigment solids dispersed in the liquid vehicle, a first copolymeric binder, and a second copolymeric binder. The polymer-encapsulated pigment solids can have a pigment core and a copolymeric shell which includes polymerized monomers. It should be noted that the terms "core" and "shell" do not infer complete encapsulation, though anything from partial encapsulation to complete encapsulation is included in accordance with embodiments of the present invention. The first copolymeric binder present in the ink-jet ink can include at least one of the multiple polymerized monomers, but is typically different as a composition than the copolymeric shell, e.g., different monomers, different proportions of monomers, different average molecular weights, different glass transition temperatures, different acid numbers, etc. The second copolymeric binder can also include at least one of the multiple polymerized monomers (same or different monomer(s) than is present in the first coplymeric binder). However, the second copolymeric binder must be different than the first copolymeric binder, e.g., different monomers, different proportions of monomers, different average molecular weights, different glass transition temperatures, different acid numbers, etc., and further, the second copolymeric binder is also compositionally different than the copolymeric shell. In a related embodiment, a method of printing an image can comprise jetting this ink-jet ink onto an inorganic particulate-containing porous media coating, preferably a glossy inorganic particulate-containing porous media coating. Exemplary drop volumes that can be effective for printing images include those ranging from 2 pL to 15 pL.

Polymer-Encapsulated Pigment

The invention described herein is directed to improved inks for printing ink-jet images using commercially-available ink-jet printers, such as those suitable for printing pigment-based ink-jet inks manufactured by Hewlett-Packard Company, Palo Alto, Calif. The ink-jet inks of the present invention can include pigment colorants such as yellow, cyan, pale cyan, magenta, pale magenta, gray, orange, green, purple, pink, red, blue, black, and other known pigment colors. Typically, the pigments of the present invention can be from about 5 nm to about 10 μm in size, and in one aspect, can be from 50 nm to about 150 nm in size, although sizes outside this range can be used if the pigment can remain dispersed and provide adequate color properties. In one detailed aspect of the present invention, the pigment can comprise from about 0.1 wt % to about 10 wt % of the ink-jet ink composition, and in another embodiment, from 0.5 wt % to 8 wt %.

Though any color or type of pigment can be used, color organic pigments or black carbon pigments are exemplified herein in accordance with embodiments of the present invention. In one embodiment, a carbon pigment can be functionalized or encapsulated with a polymeric dispersant. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. In one aspect of the present invention, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Examples of suitable commercially available carbon blacks include No. 2300, No. 900, MCF88, No. 33, No. 40, No. 45, No. 52, MA&, MA8, No. 2200B, Raven 1255, Regal 400R, Regal 330R, Regal 660 R, Mogul L, Color Black FW1, Color Black FW18, Color Black S170, Color Black S150, Printex 35, and Printex U. Other suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V.

Alternatively, organic colored pigments can also be encapsulated with a polymer in accordance with embodiments of the present invention. Exemplary pigments that are suitable for use in accordance with embodiments of the present invention include azo pigments such as azo lake pigments, insoluble azo pigments, and condensed azo pigments; as well as polycyclic pigments such as phthalocyanine pigments; quinacridone pigments, dioxazine pigments, and anthraquinone pigments. Specific pigments that are suitable for use include Pigment Blue 15:3, Pigment Green 36, Pigment Blue 15:6, Pigment Red 177, and/or Pigment Red 208 (from DIC); Pigment Red 168, Pigment Violet 23, Pigment Yellow 155, and/or Pigment Violet 19 (from Clariant); and Pigment Red 254 (from Ciba). Examples of other pigments from these and other manufacturers that can be used include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, Pigment Yellow 74, Pigment Yellow 138 Pigment Yellow 158, Pigment Yellow 128, Pigment Yellow 151, and the like; C.I. Pigment Red 5, C.I. Pigment Red 7, C.I. Pigment Red 12, C.I. Pigment Red 48 (ca), C.I. Pigment Red 48 (mn), C.I. Pigment Red 57 (Ca), C.I. Pigment Red 112, C.I. Pigment Red 122, and the like; C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, C.I. Vat Blue 6, and the like; TIPURE R-101 available from Dupont;carbon black pigment; and other pigments whose performance properties are satisfactory when formulated for the present invention are considered to be within its scope. Exemplary suitable pigments are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks", all assigned to E.I. Du Pont de Nemours and Company. Manufacturers of pigments that provide suitable pigments, some of which have been previously listed, include DIC, Cabot, Orient, BASF, Ciba, and Clariant.

Each of the above-described pigments can be encapsulated by a polymeric copolymer or polymeric dispersant. For example, in one embodiment, the polymer encapsulated and acid sensitive pigment colorant can be encapsulated with a styrene copolymer, an acrylic acid or acrylate copolymer, a methacrylic acid or methacrylate copolymer, derivatives thereof, or combinations thereof. In one embodiment, the copolymer can be styrene-acrylic acid-methacrylic acid copolymer (or ester thereof). Suitable copolymers can have any weight average molecular weight that is functional, but in one embodiment, can be from 5,000 Mw to 20,000 Mw. Further, the polymer-encapsulated pigment solids can be encapsulated by a copolymer having an acid number from 100 to 220 mg KOH/g, or in another embodiment, from 150 to 200 mg KOH/g.

Copolymer Blend

In accordance with embodiments of the present invention, it has been discovered that by blending two or more copolymers in the pigment-based ink-jet inks of the present invention, an improved image quality balance and ink-jet pen reliability profile can be achieved. In particular, it has been discovered that by blending multiple copolymeric binders in an ink-jet ink, each copolymeric binder of which containing monomer units that match at least one type of monomer unit(s) present on the surface of the pigment, improved coalescence can be achieved. For example, if the pigment is a styrene-acrylic acid-methacrylic acid (or ester thereof) copolymeric encapsulated pigment, the copolymer blend can include i) a styrene-maleic anhydride copolymer (SMA) or ester thereof and ii) a styrene-acrylic polymer or ester thereof. Alternatively, the copolymer blend might include i) a styrene-maleic anhydride copolymer or derivative thereof and ii) an acrylic acid-methacrylic acid copolymer or ester thereof. For illustrative purposes, detailed discussion related to styrene-maleic anhydride copolymers and styrene-acrylic acid copolymers (or esters thereof) is provided herein as such polymers provide favorable examples of acceptable copolymeric binders that can be used in accordance with embodiments of the present invention. However, it should be noted that these specific copolymers are not the only copolymers that can be used in accordance with embodiments of the present invention.

i) Styrene-Maleic Anhydride Copolymers or Derivatives Thereof

When referring to styrene-maleic anhydride copolymers, the anhydride forms, the ester forms, the salt forms, and the acid forms, the imide forms, the amic acid forms, and other related forms are each included. Sometimes, the term "derivatives thereof" is used to capture these and other variations. Styrene-maleic anhydride copolymers can be generally depicted in accordance with Formula 1a as follows:

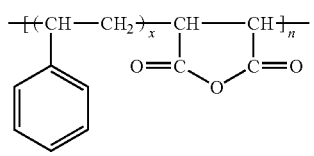

Formula 1a where x can be from 1 to 4, and n can be from 2 to 27. With respect to x, the structure shown in Formula 1a is not intended to imply that any particular positional order is present, but merely that when x is 1, the styrene to maleic anhydride molar ratio of the resin is 1:1; when x is 2, the styrene to maleic anhydride molar ratio of the resin is 2:1; when x is 3, the styrene to maleic anhydride molar ratio of the resin is 3:1; and when x is 4, the styrene to maleic anhydride molar ratio of the resin is 4:1. Resins where x is up to 8 can be used in accordance with embodiments of the present invention. Typically, the styrene units and the maleic anhydride units can be positioned somewhat randomly. As apparent by Formula 1, styrene-maleic anhydride resins are a family of low molecular weight copolymers of styrene and maleic anhydride. Various resins can have a variety of chemical structures and can exhibit a variety of properties, including high acid equivalent values, acceptable thermal stability, and high glass transition temperature (Tg).

In order to adjust the solubility in a liquid vehicle, the styrene maleic anhydride polymers can be partially or totally hydrolyzed. Hydrolysis tends to increase water solubility. A structure resulting from hydrolysis is shown in Formula 1b.

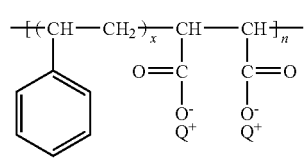

Formula 1b where x can be from 1 to 4, n can be from 2 to 27, and Q can be any functional cation or can be hydrogen when in an acid form. Exemplary cations that can be present in the hydrolyzed SMA base resin include sodium, potassium, lithium, ammonium, or mixtures thereof.

In one specific embodiment, an ammonium salt of styrene-maleic anhydride that can be used, as is shown in Formula 2 below:

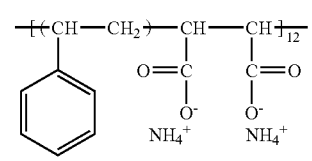

Formula 2

As can be seen by Formula 2, the styrene to maleic anhydride molar ratio of the resin is about 1:1, and there are 12 repeating units (in no particular order). Additionally, Formula 2 shows the composition in the form of an ammonium salt rather than in the anhydride form. Various other cations can be substituted in place of ammonium ions to provide additional ink-jet properties that are desirable. For example, sodium ($Na^+$), potassium ($K^+$), lithium ($Li^+$), etc.

The use of a composition in accordance with Formula 1 can provide ink-jet ink properties that are desirable in accordance with embodiments of the present invention. In one embodiment, the styrene-maleic anhydride can be present in the ink-jet ink composition at from 0.001 wt % to 6 wt %, though this range is not intended to be limiting. Additionally, in accordance with the molar ratio of styrene to maleic anhydride, and in accordance with the number of repeating units described in Formula 1, the weight average molecular weight of the styrene-maleic anhydride copolymer that can be used can be from 1,000 Mw to 15,000 Mw.

A second useful form of a styrene-maleic anhydride copolymer is a partial monoester of styrene-maleic anhydride copolymer. This form can be generally depicted in accordance with Formula 3 as follows:

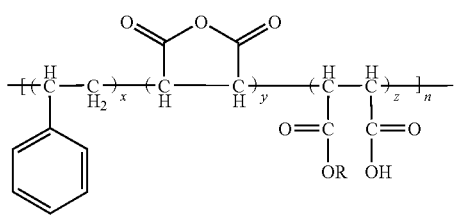

Formula 3 where x can be from 1 to 4, y can be a fraction from 0 to 1, z can be a fraction from 0 to 1, R can be alkyl, aryl, alkoxyl, substituted alkyl, substituted aryl, or substituted alkoxyl, and n can be from 2 to 27. The subunits within each of the n units in the polymer may be different. For example, when x is 1, each of the units contains one styrene subunit, from 0 to 1 maleic anhydride subunit, and from 0 to 1 monoester maleic anhydride subunit, such that the average molar ratio over all n units in the polymer is 1:y:z, where y and z can include fractional numbers from 0 to 1. With respect to x, y and z, the structure shown in Formula 3 is not intended to imply that any particular positional order is present, but merely that when x is 1, the styrene to maleic anhydride to partial monoester molar ratio of the resin is 1:y:z. When x is 2, the styrene to maleic anhydride to partial monoester molar ratio of the resin is 2:y:z; when x is 3, the styrene to maleic anhydride to partial monoester molar ratio of the resin is 3:y:z; when x is 4, the styrene to maleic anhydride to partial monoester molar ratio of the resin is 4:y:z, where y and z can include fractional numbers from 0 to 1. Typically, the styrene units, the maleic anhydride units, the monoester units can be positioned somewhat randomly. As apparent by Formula 3, partial monoester styrene-maleic anhydride resins are a family of low molecular weight copolymers of styrene and partially monoesterized maleic anhydride. Various resins can have a variety of chemical structures and can exhibit a variety of properties, including mid to high acid equivalent values, polymer surfactant properties, excellent compatibility with a broad range of formulation ingredients, and increased solvent solubility. In its salt form, the salt of the partial monoester of styrene-maleic anhydride can be an ammonium salt, a lithium salt, a sodium salt, or a potassium salt, for example. In such an embodiment, the maleic anhydride unit can each include two counter ions (as exemplified in Formula 2), and the monoester units can each include one counter ion at the carboxy group.

A third useful form of styrene-maleic anhydride copolymers is a polymer which is a partial monoester of styrene-maleic anhydride and a mixture of two alcohols. This form can be generally depicted in accordance with Formula 4 as follows:

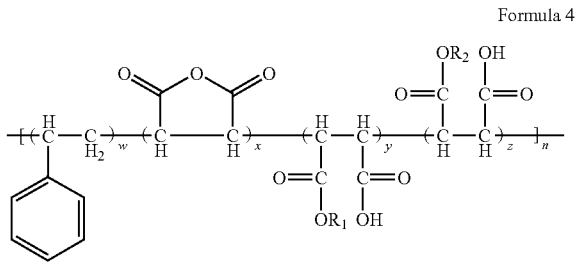

Formula 4 where w can be from 1 to 4, x can be a fraction from 0 to 1, y can be a fraction from 0 to 1, z can be a fraction from 0 to 1, $R_1$ and $R_2$ can independently be alkyl, aryl, alkoxyl, substituted alkyl, substituted aryl, or substituted alkoxyl, and n can be from 2 to 27. The subunits within each of the n units in the polymer may be different. For example, when w is 1, each of the n units contains one styrene subunit, from 0 to 1 maleic anhydride subunit, from 0 to 1 $R_1$ monoester maleic anhydride subunit, and from 0 to 1 $R_2$ monoester maleic anhydride subunit, such that the average molar ratio over all n units in the polymer is 1:x:y:z. With respect to w, x, y, and z, the structure shown in Formula 4 are not intended to imply that any particular positional order is present, but merely that when w is 1, the styrene to maleic anhydride to $R_1$ monoester maleic anhydride to $R_2$ monoester maleic anhydride subunit molar ratio of the resin is 1:x:y:z. When x is 2, the styrene to maleic anhydride to $R_1$ monoester maleic anhydride to $R_2$ monoester maleic anhydride subunit molar ratio of the resin is 2:x:y:z; when x is 3, the styrene to maleic anhydride to $R_1$ monoester maleic anhydride to $R_2$ monoester maleic anhydride subunit molar ratio of the resin is 3:x:y:z; and when x is 4, the styrene to maleic anhydride to $R_1$ monoester maleic anhydride to $R_2$ monoester maleic anhydride subunit molar ratio of the resin is 4:x:y:z. Typically, the styrene units and the maleic anhydride units and the $R_1$ monoester units and the $R_2$ monoester maleic anhydride units can be positioned somewhat randomly.

As apparent by Formula 4, partial monoester styrene-maleic anhydride resins are a family of low molecular weight copolymers of styrene and partially monoesterized maleic anhydride and two alcohols. Various resins can have a variety of chemical structures and can exhibit a variety of properties, including high acid equivalent values, polymer surfactant properties, excellent compatibility with a broad range of formulation ingredients, increased solvent solubility, high thermal stability, and high glass transition temperature (Tg). In its salt form, the salt of the partial monoester of styrene-maleic anhydride can be an ammonium salt, a lithium salt, a sodium salt, or a potassium salt, for example. In such an embodiment, the maleic anhydride unit can each include two counter ions (as exemplified in Formula 2), and each of the monoester units can each include one counter ion at the carboxy group.

A fourth useful form of a styrene-maleic anhydride copolymer is a styrene-maleic anhydride resin amic acid copolymer. This form can be generally depicted in accordance with Formula 5 as follows:

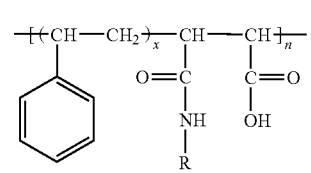

Formula 5 where x can be from 1 to 4, R can be alkyl, aryl, alkoxyl, substituted alkyl, substituted aryl, or substituted alkoxyl, for example, and n can be from 2 to 27. With respect to x, the structure shown in Formula 7 is not intended to imply that any particular positional order is present, but merely that when x is 1, the styrene to maleic anhydride amic acid molar ratio of the resin is 1:1; when x is 2, the styrene to maleic anhydride amic acid molar ratio of the resin is 2:1; when x is 3, the maleic anhydride amic acid molar ratio of the resin is 3:1; and when x is 4, the styrene to maleic anhydride amic acid molar ratio of the resin is 4:1. Resins where x is up to 8 can be used in accordance with embodiments of the present invention. Typically, the styrene units and the maleic anhydride amic acid units can be positioned somewhat randomly. Various resins can have a variety of chemical structures and can exhibit a variety of properties, including thermal stability and surfactant properties. As a salt, the composition can be in the form of an ammonium salt, a lithium salt, a sodium salt, or a potassium salt, for example.

Though the above examples of types of styrene-maleic anhydride copolymers are specifically described, other that are functional in accordance with embodiments of the present invention can also be used. For example, various SMA imides, SMA esters, SMA alkyl esters, and SMA copolymers outside of the above-described ranges and ratios can also be useful in accordance with embodiments of the present invention. Further, appropriate molecular weights can also be chosen for a specific application. This being stated, weight average molecular weights can range from 1,000 Mw to about 15,000, or from 2,000 Mw to 9,000 Mw.

It should be noted that in order to qualify as a styrene-maleic anhydride copolymer in accordance with embodiments of the present invention, at least styrene and maleic anhydride (or hydrolyzed or derivatized maleic anhydride) monomers must be present to form the finished copolymer. These two monomers can be used alone to form the copolymer, or other monomers can be present as well in forming the copolymer, e.g., methacrylic acid or esters thereof, butyl acrylate or esters thereof, etc.

ii) Styrene-Acrylic Acid Copolymer or Derivatives Thereof

With respect to the styrene-acrylic acid copolymer (or derivatives/esters thereof) that can be used in accordance with embodiments of the present invention, any functional amount (wt % of ink) or ratio (weight ratio with respect to the other copolymer present in the ink-jet) can be used. In one embodiment, a styrene-acrylic acid copolymer or ester thereof can be used and can be present at from about 1 wt % to about 10 wt % in the ink-jet ink. Further, if styrene-maleic anhydride copolymer is used as the other binder, the weight ratio of styrene-maleic anhydride copolymer to styrene-acrylic acid copolymer can be from about 5:1 to about 1:5.

Further, various varieties of styrene-acrylic acid copolymer (or derivatives/esters thereof) can be used. Exemplary copolymers that can be used include Joncryl copolymers from Johnson Polymers. In one embodiment, the weight average molecular weight of the styrene-acrylic acid copolymer or derivative thereof can be from about 2,000 Mw to 15,000 Mw. Specific styrene-acrylic acid copolymers that are exemplary for use include styrene-acrylic acid copolymer (4,000 Mw to 10,000 Mw with 70-95 wt % styrene and 5-30 wt % acrylic acid); styrene-acrylic acid-methacrylic acid copolymer (4,000 Mw to 10,000 Mw with 20-80 wt % styrene, 5-20 wt % acrylic acid, and 5-20 wt % methacrylic acid); and styrene-acrylic acid-methacrylic acid-butyl acrylate (4,000 Mw to 10,000 Mw with 20-70 wt % styrene, 5-20 wt % acrylic acid, 5-20 wt % methacrylic acid, and 20-60 wt % butyl acrylate). Again, it should be noted that any of these polymers can include a derivative thereof, such as one of the related esters, e.g., acrylates of varying ester groups, metacylates with varying ester groups, etc. Further, other monomers that may be used instead of or addition to the above-mentioned monomers include 2-ethylhexyl acrylate, methoxy ethylene glycol acrylate (EO:3mol), and methoxy ethylene glycol acrylate (EO:9mol) at weight ratios ranging from 2 wt % to about 60 wt %. Though the above examples of types of styrene-acrylic acid copolymers are specifically described, others that are functional in accordance with embodiments of the present invention can also be used.

It should be noted that in order to qualify as a styrene-acrylic acid copolymer or derivative thereof in accordance with embodiments of the present invention, at least styrene and acrylic acid (or acrylate) monomers must be present to form the finished copolymer. These two monomers can be used alone to form the two monomer-containing copolymer, or other monomers can be present as well in forming the copolymer, e.g., methacrylic acid, butyl acrylate, etc.

iii) Selection of Polymeric Polymer Blend

In selecting the polymers for inclusion in the polymer blend in accordance with embodiments of the present invention, it has been recognized that it is beneficial to use copolymers that are prepared with at least one polymerized monomer in common with respect to the copolymeric shell of polymer-encapsulated pigment. For example, if the pigment is encapsulated with a styrene-acrylic acid-methacrylic acid copolymer, then each of the copolymers of the binder blend can likewise be prepared using styrene monomers, acrylic acid monomers, and/or methacrylic acid monomers. To illustrate, a suitable blend of copolymers for use with a pigment encapsulated with a styrene-acrylic acid-methacrylic acid copolymer might be styrene-acrylic acid copolymer and styrene-maleic anhydride copolymer. In this example, styrene is present in the polymer encapsulated pigment, and is present in both of the copolymeric binders. More broadly, copolymers that are suitable would include copolymers including styrene, copolymers including acrylic acid (or an acrylate), or copolymers including methacrylic acid (or a methacrylate). In a more detailed embodiment, though not required, it can also be beneficial to select the two (or more) copolymers for use in the polymeric blend that have also used a common monomer in their respective preparations thereof. In summary, it has been discovered that by utilizing binders that have common monomer precursors, the binders and the polymer-encapsulated pigments can be more readily evenly blended when printed on a media substrate.

Examples of other binders that can be selected for use, some of which overlap with those previously described, include polyester, polyester-melanine, styrene-acrylic acid-alkyl acrylate copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, styrene-acrylic acid-methacrylic acid copolymers, and derivatives and salts thereof. Again, it should be noted that when multiple monomers are listed as part of a copolymer, such a designation is an open listing of monomers present in the copolymer.

In addition to the above copolymers described, it should further be noted that other monomers, crosslinking agents, etc., can also be used to form the copolymeric binders. Further, it should be noted that if the binder is in a particulate dispersed form, then it is not considered to be part of the liquid vehicle, but is considered to be carried by liquid vehicle.

Liquid Vehicle Components

As described previously, a liquid vehicle can be used to carry the pigment solids, as well as other solids that may be present in the ink-jet ink compositions of the present invention. More specifically, the liquid vehicle can include water, and from 5 wt % to 35 wt % total organic solvent content, along with other optional liquid components. With respect to the total organic-co-solvent content, co-solvents for use in the present invention include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, EG-2, Liponic ethylene glycol 1 (LEG-1), Liponic ethylene glycol 7 (LEG-7), 2-methyl-2,4-pentanediol, 2-methyl-1,3-propanediol, 1,2-hexanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or other properties of the ink such as viscosity, pH, surface tension, optical density, and print quality. Various buffering agents, such as TRIS buffer or MOPS buffer, can also be optionally used in the ink-jet ink compositions of the present invention.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

In one aspect of the present invention, the ink-jet ink compositions can be substantially free of surfactants. However, typically, such components can be used and may include standard water-soluble surfactants such as fluorinated surfactants, alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be present at from 0.001 wt % to 10 wt % of the ink-jet ink composition, and in one embodiment, can be present at from 0.001 wt % to 0.1 wt %.

The following example illustrates the embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be the most practical and preferred embodiments of the invention.

EXAMPLE

Twelve light gray ink-jet inks were prepared and printed on HP advanced photo paper. Each of the inks, after printing, was scored for coalescence using a subjective scale ranging from −2 to +2 (−2 exhibiting the poorest performance and +2 exhibiting the best performance). Five people ranked the printed inks and the scores were averaged. The ink formulations and respective scores are provided for convenience in Tables 1 and 2:

TABLE 1

| Ink Components | Light gray ink-jet ink | | | | | |
|---|---|---|---|---|---|---|
| | Ink 1 | Ink 2 | Ink 3 | Ink 4 | Ink 5 | Ink 6 |
| Proxel GXL | 0.1 | 0.1 | 0.1 | 0.1 | 0.1 | 0.1 |
| Diethylene glycol | 2 | 2 | 2 | 2 | 2 | 2 |
| Ethoxylated Glycerol | 3 | 3 | 3 | 3 | 3 | 3 |
| 2-pyrrolidone | 6 | 6 | 6 | 6 | 6 | 6 |
| Glycerol | 5 | 5 | 5 | 5 | 5 | 5 |
| 1,2-hexanediol | 4 | 4 | 4 | 4 | 4 | 4 |
| Fluorosurfactant | 0.19 | 0.19 | 0.19 | 0.19 | 0.19 | 0.19 |
| Triethanolamine | 1 | 1 | 1 | 1 | 1 | 1 |
| Cyan PB15 *encapsulated with styrene-MAA-AC Acid value 155 | 0.65 | — | — | — | — | — |
| Cyan PB15 *encapsulated with styrene-MAA-AC Acid value 185 | — | 0.66 | 0.66 | 0.66 | 0.66 | 0.66 |
| Carbon black *encapsulated with styrene-MAA-AC Acid value 155 | 2.75 | 2.75 | 2.75 | 2.75 | 2.75 | 2.75 |
| Violet PB23 *encapsulated with styrene-MAA-AC Acid value 155 | 0.48 | 0.48 | 0.48 | 0.48 | 0.48 | 0.48 |
| Acetylenicdiol surfactant | 0.65 | 0..65 | 0.65 | 0.65 | 0.65 | 0.65 |
| SMA 1440F (20% solids) | 5 | 5 | 5 | 2.5 | 3.75 | — |
| Styrene-acrylate binder (20% solids) | 5 | 5 | 5 | 2.5 | 3.75 | 10 |
| Deionized water | 64.18 | 64.17 | 64.17 | 69.17 | 66.67 | 64.17 |
| Total | 100 | 100 | 100 | 100 | 100 | 100 |

TABLE 1-continued

Light gray ink-jet ink

| Ink Components | Ink 1 | Ink 2 | Ink 3 | Ink 4 | Ink 5 | Ink 6 |
|---|---|---|---|---|---|---|
| Adjust pH if below 9.2 with KOH | | | | | | |
| Coalescence Score | +1.08 | +0.67 | +0.9 | 0 | +0.92 | −0.58 |

*Pigment encapsulated with 5,000 Mw to 15,000 Mw copolymer of styrene-acrylic acid-methacrylic acid

TABLE 2

Light gray ink-jet ink

| Ink Components | Ink 7 | Ink 8 | Ink 9 | Ink 10 | Ink 11 | Ink 12 |
|---|---|---|---|---|---|---|
| Proxel GXL | 0.1 | 0.1 | 0.1 | 0.1 | 0.1 | 0.1 |
| Diethylene glycol | 2 | 2 | 2 | 2 | 2 | 2 |
| Ethoxylated Glycerol | 3 | 3 | 3 | 3 | 3 | 3 |
| 2-pyrrolidone | 6 | 6 | 6 | 6 | 6 | 6 |
| Glycerol | 5 | 5 | 5 | 5 | 5 | 5 |
| 1,2-hexanediol | 4 | 4 | 4 | 4 | 4 | 4 |
| Fluorinated surfactant | 0.2 | 0.19 | 0.19 | 0.19 | 0.19 | 0.19 |
| Triethanolamine | 0.8 | 1 | 1 | 1 | 1 | 1 |
| Cyan PB15 *encapsulated with styrene-MAA-AC Acid Value 185 | 0.66 | 0.66 | 0.66 | 0.66 | 0.66 | 0.66 |
| Carbon black *encapsulated with styrene-MAA-AC Acid Value 155 | 2.75 | 2.75 | 2.75 | 2.75 | 2.75 | 2.75 |
| Violet PB23 *encapsulated with styrene-MAA-AC Acid Value 155 | 0.48 | 0.48 | 0.48 | 0.48 | 0.48 | 0.48 |
| Nonionic aliphatic surfactant | 0.5 | 0.6 | 0.6 | 0.6 | 0.6 | 0.6 |
| SMA 1440F (20% solids) | — | 5 | — | 3.75 | 2.5 | — |
| Styrene-acrylate binder (20% solids) | 2.5 | 5 | 10 | 3.75 | 2.5 | 2.5 |
| Deionized water | 64.18 | 64.17 | 64.17 | 69.17 | 66.67 | 64.17 |
| Total | 100 | 100 | 100 | 100 | 100 | 100 |
| Adjust pH if below 9.2 with KOH | | | | | | |
| Coalescence Score | −0.75 | 1 | −0.9 | 0 | 0.5 | −1 |

*Pigment encapsulated with 5,000 Mw to 15,000 Mw copolymer of styrene-acrylic acid-methacrylic acid As can be seen in Tables 1 and 2, all of the negative (−) scores occurred when only one of the two polymers was present in the ink-jet ink. Conversely, the neutral to positive scores were obtained when the blended styrene-maleic anhydride copolymer and styrene-acrylic acid copolymer was present. In this specific example, it has been discovered that the use of styrene-maleic anhydride improves image quality, and the styrene-acrylate contributes to both image quality and ink-jet architecture reliability.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink, comprising:
   a) an aqueous liquid vehicle;
   b) polymer-encapsulated pigment solids dispersed in the liquid vehicle, said polymer-encapsulated pigment solids having a pigment core and a copolymeric shell, said copolymeric shell including multiple polymerized monomers;
   c) a first copolymeric binder present in the ink-jet ink, wherein the first copolymeric binder includes at least one of the multiple polymerized monomers, and further, is different than the copolymeric shell; and
   d) a second copolymeric binder present in the ink-jet ink, wherein the second copolymeric binder includes at least one of the multiple polymerized monomers, and further, is different than the copolymeric shell and the first copolymeric binder.

2. The ink-jet ink of claim 1, wherein the copolymeric shell comprises styrene units, methacrylic acid units, methacrylate units, acrylic acid units, or acrylate units.

3. The ink-jet ink of claim 2, wherein the copolymeric shell is a styrene-acrylic acid-methacrylic acid copolymer or ester thereof having a weight average molecular weight from about 5,000 Mw to 20,000 Mw.

4. The ink-jet ink of claim 1, wherein the first copolymeric binder is a styrene-maleic anhydride copolymer or derivative thereof.

5. The ink-jet ink of claim 4, wherein the styrene-maleic anhydride copolymer has a weight average molecular weight from about 1,000 Mw to about 15,000 Mw.

6. The ink-jet ink of claim 4, wherein the styrene-maleic anhydride copolymer has a weight average molecular weight from about 2,000 Mw to about 9,000 Mw.

7. The ink-jet ink of claim 1, wherein the second copolymeric binder is a styrene-acrylic acid copolymer or ester thereof.

8. The ink-jet ink of claim 7, wherein the styrene-acrylic acid copolymer or ester thereof has a weight average molecular weight from about 2,000 Mw to about 15,000 Mw.

9. The ink-jet ink of claim 1, wherein the copolymeric shell comprises styrene units, methacrylic acid units, methacrylate units, acrylic acid units, or acrylate units; the first copolymeric binder is a styrene-maleic anhydride copolymer or derivative thereof; and the second copolymeric binder is a styrene-acrylic acid copolymer or ester thereof.

10. The ink-jet ink of claim 1, wherein the aqueous liquid vehicle includes an organic solvent selected from the group consisting of diethylene glycol, liponics ethylene glycol-1,2 pyrrolidone, glycerol, 1,2-hexanediol, triethanolamine, and mixtures thereof.

11. The ink-jet ink of claim 1, wherein the aqueous liquid vehicle includes triethanolamine.

12. The ink-jet ink of claim 1, wherein the ink-jet ink further comprises from 0.001 wt % to 0.5 wt % surfactant.

13. The ink-jet ink of claim 1, wherein the polymer-encapsulated pigment solids have an average size from about 5 nm to about 10 μm.

14. The ink-jet ink of claim 13, wherein the polymer-encapsulated pigment solids have an average size from about 50 nm to about 150 nm.

15. The ink-jet ink of claim 1, wherein the polymer-encapsulated pigment solids include a blend of multiple colors of pigment solids.

16. The ink-jet ink of claim 1, wherein the polymer-encapsulated pigment solids are encapsulated by a copolymer having an acid number from 100 to 220 mg KOH/g.

17. The ink-jet ink of claim 1, wherein the polymer-encapsulated pigment solids are encapsulated by a copolymer having an acid number from 150 to 200 mg KOH/g.

18. A method of printing an image, comprising jetting an ink-jet ink onto an inorganic particulate-containing porous media coating, said ink-jet ink comprising:
   a) an aqueous liquid vehicle;
   b) polymer-encapsulated pigment solids dispersed in the liquid vehicle, said polymer-encapsulated pigment solids having a pigment core and a copolymeric shell, said copolymeric shell including multiple polymerized monomers;
   c) a first copolymeric binder present in the ink-jet ink, wherein the first copolymeric binder includes at least one of the multiple polymerized monomers, and further, is different than the copolymeric shell; and
   d) a second copolymeric binder present in the ink-jet ink, wherein the second copolymeric binder includes at least one of the multiple polymerized monomers, and further, is different than the copolymeric shell and the first copolymeric binder.

19. The method of claim 18, wherein the copolymeric shell comprises styrene units, methacrylic acid units, methacrylate units, acrylic acid units, or acrylate units.

20. The method of claim 18, wherein the copolymeric shell is a styrene-acrylic acid-methacrylic acid copolymer or ester thereof having a weight average molecular weight from about 5,000 Mw to 20,000 Mw.

21. The method of claim 18, wherein the first copolymeric binder is a styrene-maleic anhydride copolymer or derivative thereof.

22. The method of claim 21, wherein the styrene-maleic anhydride copolymer or derivative thereof has a weight average molecular weight from about 1,000 Mw to about 15,000 Mw.

23. The method of claim 21, wherein the styrene-maleic anhydride copolymer or derivative thereof has a weight average molecular weight from about 2,000 Mw to about 9,000 Mw.

24. The method of claim 18, wherein the second copolymeric binder is a styrene-acrylic acid copolymer or ester thereof.

25. The method of claim 24, wherein the styrene-acrylic acid copolymer or ester thereof has a weight average molecular weight from about 2,000 Mw to about 15,000 Mw.

26. The method of claim 18, wherein the copolymeric shell comprises styrene units, methacrylic acid units, methacrylate units, acrylic acid units, or acrylate units; the first copolymeric binder is a styrene-maleic anhydride copolymer or derivative thereof; and the second copolymeric binder is a styrene-acrylic acid copolymer or ester thereof.

27. The method of claim 18, wherein the aqueous liquid vehicle includes an organic solvent selected from the group consisting of diethylene glycol, liponics ethylene glycol-1,2 pyrrolidone, glycerol, 1,2-hexanediol, triethanolamine, and mixtures thereof.

28. The method of claim 18, wherein the aqueous liquid vehicle includes triethanolamine.

29. The method of claim 18, wherein the ink-jet ink further comprises from 0.001 wt % to 0.5 wt % surfactant.

30. The method of claim 18, wherein the polymer-encapsulated pigment solids have an average size from about 5 nm to about 10 μm.

31. The method of claim 30, wherein the polymer-encapsulated pigment solids have an average size from about 50 nm to about 150 nm.

32. The method of claim 18, wherein the polymer-encapsulated pigment solids include a blend of multiple colors of pigment solids.

33. The method of claim 18, wherein the step of jetting includes jetting the ink-jet ink at a drop volume from about 2 pL to 15 pL.

34. The method of claim 18, wherein the step of jetting includes jetting the ink-jet ink onto the media coating such that the ink-jet ink becomes blended with a second ink-jet ink, said second ink-jet ink including a pigment colorant and at least one of the first copolymeric binder or the second copolymeric binder.

35. The method of claim 18, wherein the polymer-encapsulated pigment solids are encapsulated by a copolymer having an acid number from 100 to 220 mg KOH/g.

36. The method of claim 18, wherein the polymer-encapsulated pigment solids are encapsulated by a copolymer having an acid number from 150 to 200 mg KOH/g.

* * * * *

UNITED STATES PATENT AND TRADEMARK OFFICE
CERTIFICATE OF CORRECTION

| | | |
|---|---|---|
| PATENT NO. | : 7,655,707 B2 | Page 1 of 1 |
| APPLICATION NO. | : 11/292580 | |
| DATED | : February 2, 2010 | |
| INVENTOR(S) | : Zeying Ma | |

It is certified that error appears in the above-identified patent and that said Letters Patent is hereby corrected as shown below:

In column 14, line 52, in Claim 1, after "and" insert -- includes at least one polymerized monomer not included in --.

In column 15, line 57, in Claim 18, after "and" insert -- includes at least one polymerized monomer not included in --.

Signed and Sealed this
Twenty-fourth Day of May, 2011

David J. Kappos
*Director of the United States Patent and Trademark Office*